Figure 1:
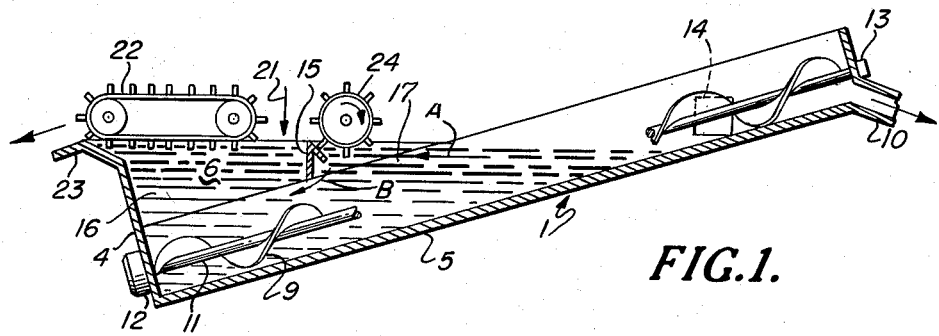

July 26, 1955   F. J. FONTEIN   2,713,945
SEPARATION OF MIXTURES OF SOLID PARTICLES
DIFFERING IN SPECIFIC GRAVITY
Filed May 12, 1952

INVENTOR

FREERK J. FONTEIN

BY *Cushman, Darby & Cushman*

ATTORNEY

United States Patent Office 2,713,945
Patented July 26, 1955

2,713,945

SEPARATION OF MIXTURES OF SOLID PARTICLES DIFFERING IN SPECIFIC GRAVITY

Freerk J. Fontein, Heerlen, Netherlands, assignor to Stamicarbon N. V., Heerlen, Netherlands Application May 12, 1952, Serial No. 287,376

Claims priority, application Netherlands May 15, 1951

4 Claims. (Cl. 209—172.5)

This invention relates to an apparatus for separating mixtures of solid particles differing in specific gravity into a fraction containing the particles of low specific gravity and another fraction containing particles of high specific gravity. More particularly, the invention relates to an improvement in an apparatus for separating a mixture introduced into a pool of gradually increasing depth such as an elongated wedge-shaped pool of heavy medium. The settled heavy particles or sink are conveyed to the shallow end of the medium pool and discharged, whereas the light particles or float are discharged from the level of the pool.

Prior apparatuses have proved unsatisfactory in that the particles of low specific gravity which get into the shallow section of the pool are removed by the conveyor together with the heavy fraction. In the case of coal being washed, a certain amount of coal would be lost in the shale fraction while in the case of ores being washed, the purified ore fraction is contaminated with gangue.

Therefore, an object of the present invention is to provide a novel, simple, and efficient apparatus for the separation of mixtures of solids.

Another object of the invention is to provide an apparatus for the separation of solids in which the fractions separated are of a high purity content.

Still another object of the invention is to provide an apparatus for the separation of solids in an elongated wedge-shaped pool of heavy medium in which the light particles are prevented, or at least hindered, from entering the shallow part of the pool.

A further object of the invention is to provide an apparatus for the separation of solids in an elongated wedge-shaped pool of heavy medium, in which the light particles present in the shallow section of the pool are prevented from being discharged with the fraction of high specific gravity.

A further object of the invention is to provide an apparatus for the separation of solids in an elongated wedge-shaped pool of heavy medium in which the light particles present in the shallow part of the pool are returned to the deep part of the pool where they may be easily removed.

With these objects in view, an apparatus has been invented whereby an intensified current of heavy medium is generated in the upper region of the pool at the shallow end thereof for discharging the particles of low specific gravity.

Figure 2:
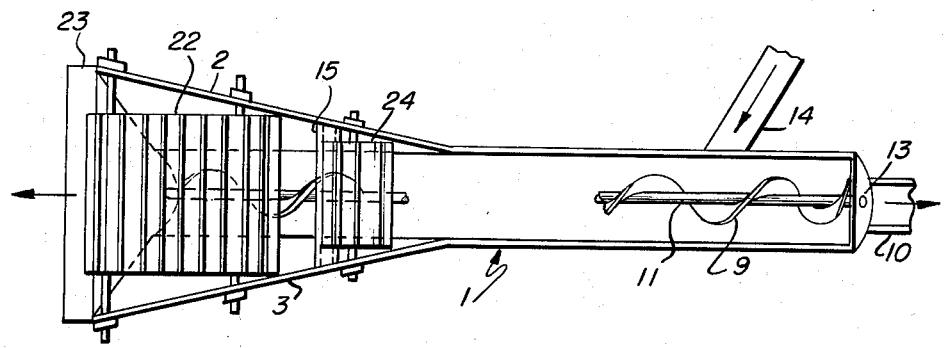

These and other objects of the invention will be apparent from the specification, claims, and drawings, in which:

Figure 1 is a vertical section of the elongated wedge-shaped tank of the present invention; and Figure 2 is a plan view of the elongated wedge-shaped tank of Figure 1.

Referring specifically to the drawings wherein like characters or reference numerals represent like or similar parts, the separating tank 1 is formed by the two side walls 2 and 3, a steeply inclined outwardly overhanging end wall 4 and a moderately inclined bottom 5 rising upwardly from the base of the end wall 4. The separating tank 1 is filled with a heavy medium 6 which may be a suspension of magnetite in water of the desired specific gravity. It is well to note that the heavy medium 6 must be of a specific gravity determined by the specific gravities of the mixture to be separated. Thus, the specific gravity of the medium must be such that the light particles of the mixture to be separated will float therein while the heavy particles will sink.

An overflow outlet or weir 23 is provided on the top of the overhanging end wall 4 in the deep end of tank 1. Light particles of the mixtures to be separated, such as clean coal, will float on the heavy liquid or medium 6 and will be dispensed over the overflow outlet 23 as will be more fully described later in the specification. An overflow outlet 10 is provided at the opposite end or shallow portion of tank 1 above the level of the liquid 6 therein, for discharge of heavy particles such as shale which sink in the separating liquid or medium 6. By having outlet 10 above the level of liquid 6 in tank 1, the liquid will not be discharged with the heavy particles.

A screw conveyor 9 is longitudinally mounted in the tank 1 parallel to its bottom 5. As clearly shown in Figure 1, screw conveyor 9 is supported on a shaft 11 mounted on an incline in the bottom of tank 1. Shaft 11 may be supported at its ends by suitable bearings 12 and 13. Any source of power may be used to rotate the shaft and, thus, rotate the screw conveyor 9. Heavy particles which sink to the bottom of tank 1 will be conveyed by the rotating screw conveyor 9 upwardly along the inclined bottom 5 and discharge through the outlet 10 of the shallow end of the tank 1.

Mounted transversely in the tank 1 is a cross-partition wall 15 which divides the tank into a deep compartment 16 and a shallow compartment 17. The lower transverse edge of the partition 15 is spaced from screw conveyor 9 so that there may be a flow of fluid between the deep compartment 16 and the shallow compartment 17. A scraper wheel 24 is provided in the shallow compartment 17 of tank 1 adjacent cross-partition wall 15. The scraper wheel 24 is mounted transversely of the tank and rotates in such a manner as to scrape light particles floating on or near the surface of the shallow compartment over the cross-partition wall into the deep compartment 16 where the light particles are subjected to a secondary treatment.

A second scraper device 22 is provided in the deep compartment adjacent the overflow weir 23 for discharging the light fraction floating in deep compartment 16 over the overflow outlet or weir 23. Scraper 22 may be of the endless conveyor type as shown in Figures 1 and 2.

The mixture to be separated is introduced into the heavy separating liquid or mediumt 6 intermediate the discharge outlets 10 and 23 as indicated at 21 in any suitable manner. The heavy separating liquid or medium 6 is introduced at the shallow end of tank 1 through a conduit 14 and creates an intensified reverse current A to the current created by the pump action of screw conveyor 9 toward the shallow end of tank 1. The current A is deflected downwardly by the cross-partition wall 15 and the liquid flows into the deep compartment 16, as indicated by the arrow B, between the lower edge of cross-partition 15 and the screw conveyor 9. Any of the light particles which may happen to be carried by the heavy particles toward the bottom of the tank and are caught in the current caused by the purging action of conveyor 9 will be hindered from entering the shallow compartment 17 by the countercurrent created in the heavy medium 6 at B. Should any of the light particles be carried into the shallow compartment 17 by the heavy particles being moved upwardly along the inclined bottom 5 by screw conveyor 9, the light particles will be eventually released in the shallow compartment and will float to the surface. However, the intensified current A will carry the light particles toward scraper 24 where they are thrown over the partition wall 15, back into the deep compartment 16 where they are removed by scraper 22 over the overflow outlet or weir 23.

The operation of the device may be briefly described as follows. The tank 1 is filled and replenished with the heavy separating medium 6 through the inlet conduit 14. By having the conduit 14 at the shallow portion of the tank, current of the liquid in the tank will be in the direction A and will be intensified as it flows between the partition wall and screw conveyor 9 into the deep compartment 16 of the tank. A mixture such as coal and shale is introduced to the tank intermediate its ends as shown at 21. The heavy particles of the mixture such as the shale will immediately drop to the bottom of the tank where they are carried upwardly along the inclined bottom 5 by screw conveyor 9 and discharged from the outlet 10 above the level of liquid 6 in the tank. The majority of light particles, such as coal, will float in the deep compartment and will be conveyed by the scraper 22 over the overflow outlet 23. Any of the light particles which may possibly be entrapped by the heavy particles and conveyed upwardly along the inclined bottom 5 by screw conveyor 9 will be released in the shallow compartment 17 where the intensified current A will cause the floating particles to travel toward scraper wheel 24. The particles are then transferred over partition wall 15 by the scraper 24 and are then discharged by the scraper 22 over weir 23. Light particles released from the heavy particles adjacent partition wall 15 will be impeded from traveling into the shallow compartment 17 by the intensified current B and will float to the surface of the deep compartment 16 where they too are discharged by scraper 22 over weir 23.

The terminology used in the specification is for the purpose of description and not for limitation as the scope of the invention is defined by the claims.

I claim:

1. An apparatus for separating mixtures of particles differing in specific gravity into a fraction containing floating particles of low specific gravity and another fraction containing settled particles of high specific gravity comprising a tank for receiving a heavy separating medium, said tank having an inclined bottom, means for introducing the mixture to be separated into the tank, conveyor means for removing settled particles from the tank along the inclined bottom, a partition wall vertically positioned in said tank intermediate of and at a substantial midpoint between the ends of said tank for dividing the tank into a deep compartment and a shallow compartment, said partition wall having its lower edge spaced above said conveyor means, means in the shallow end of said tank for introducing the heavy separating medium for generating an intensified substantially horizontal current in the medium in the shallow part of said tank in a direction opposite to the direction of conveyance of the conveyor, means in the shallow compartment of said tank positioned adjacent the transverse partition wall for discharging floating particles from the surface of the shallow compartment over the transverse partition wall into the deep compartment, and means in the deep compartment of said tank for discharging floating particles in the deep compartment of said tank therefrom.

2. An apparatus of the character described in claim 1 wherein the means for discharging the floating particles from the shallow compartment over the partition wall into the deep compartment is a rotary scraper device.

3. An apparatus of the character described in claim 1 wherein the means for discharging floating particles in the deep compartment of said tank therefrom includes an overflow weir and a scraper device positioned adjacent said weir.

4. An apparatus of the character described in claim 1 wherein the means for introducing the mixture to be separated into the tank is positioned intermediate the discharges of the floating and settled particles.

References Cited in the file of this patent

UNITED STATES PATENTS

| Number | Name | Date |
|---|---|---|
| 890,876 | Scaife | June 16, 1908 |
| 1,048,767 | Twedt | Dec. 21, 1912 |
| 1,290,515 | Conklin | Jan. 7, 1919 |
| 1,743,179 | Zeb | Jan. 14, 1930 |
| 1,777,182 | Rothelius | Sept. 30, 1930 |
| 2,025,841 | Young | Dec. 31, 1935 |
| 2,113,609 | Wuensch | Apr. 12, 1938 |
| 2,347,264 | Holt et al. | Apr. 25, 1944 |
| 2,545,517 | Harris et al. | Mar. 20, 1951 |
| 2,621,791 | Bitzer | Dec. 16, 1952 |

FOREIGN PATENTS

| Number | Country | Date |
|---|---|---|
| 559,264 | Great Britain | Feb. 11, 1944 |